(12) United States Patent
Nakaju

(10) Patent No.: US 8,154,744 B2
(45) Date of Patent: Apr. 10, 2012

(54) INFORMATION PROCESSING DEVICE

(75) Inventor: Asami Nakaju, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1047 days.

(21) Appl. No.: 11/716,589

(22) Filed: Mar. 12, 2007

(65) Prior Publication Data
US 2007/0216945 A1   Sep. 20, 2007

(30) Foreign Application Priority Data

Mar. 17, 2006 (JP) .................................. 2006-075647
Jan. 29, 2007 (JP) .................................. 2007-018552

(51) Int. Cl.
*G06F 3/12* (2006.01)
(52) U.S. Cl. ...................... 358/1.15; 358/1.13; 358/1.14
(58) Field of Classification Search .................. 358/1.15, 358/1.13, 1.14; 347/5
See application file for complete search history.

(56) References Cited

U.S. PATENT DOCUMENTS

| | | | | |
|---|---|---|---|---|
| 5,799,139 | A * | 8/1998 | Yamamoto et al. | 358/1.15 |
| 6,667,813 | B2 * | 12/2003 | Saruwatari et al. | 358/1.15 |
| 6,989,907 | B1 * | 1/2006 | Jeyachandran et al. | 358/1.15 |
| 2001/0030755 | A1 | 10/2001 | Yamade | |
| 2002/0030839 | A1 * | 3/2002 | Kawanabe et al. | 358/1.13 |
| 2002/0165984 | A1 * | 11/2002 | Yuki | 709/245 |
| 2004/0212829 | A1 | 10/2004 | Uchida | |
| 2004/0218209 | A1 * | 11/2004 | Hamaguchi et al. | 358/1.15 |
| 2005/0206951 | A1 * | 9/2005 | Muranaka | 358/1.15 |
| 2006/0071953 | A1 * | 4/2006 | Yasue et al. | 347/5 |

FOREIGN PATENT DOCUMENTS

| | | |
|---|---|---|
| JP | 2001-075758 | 3/2001 |
| JP | 2001-260492 | 9/2001 |
| JP | 2001-282661 | 10/2001 |
| JP | 2004-310488 | 11/2004 |
| JP | 2004-326601 | 11/2004 |
| JP | 2005-173701 | 6/2005 |

* cited by examiner

*Primary Examiner* — King Poon
*Assistant Examiner* — Allen H Nguyen
(74) *Attorney, Agent, or Firm* — Dickstein Shapiro LLP

(57) ABSTRACT

An information processing device is disclosed that is able to extend functions without performing installation and enables easy function settings. The information processing device is able to communicate with an image forming device, and includes a storage unit for storing basic information of the information processing device; an information acquisition unit for acquiring function information from the image forming device; a function detection unit for detecting a function of the image forming device from the function information; and a storage controller which determines whether function data of the detected function is included in the basic information, and modifies the basic information according to the determination results. When the function data of the detected function is not included in the basic information, the storage controller stores the function data in the storage unit.

20 Claims, 5 Drawing Sheets

FIG.3A

```
Function P(1, status)
Function P(2, status)
Function P(3, status)
...
...
Function P(N, status)
```

FIG.3B

```
Function D(1, status)   ⎫
Function D(2, status)   ⎬ 31
...                     ⎪
Function D(X, status)   ⎭

Function DT(1, status)  ⎫
Function DT(2, status)  ⎬ 32
...                     ⎪
Function DT(Y, status)  ⎭
```

INFORMATION PROCESSING DEVICE

BACKGROUND OF THE INVENTION

1. Field of the Invention

The present invention relates to an information processing device able to communicate with an image forming device.

2. Description of the Related Art

When a host terminal, like a personal computer (PC), and an image forming device, like a printer, are connected through a network, usually software known as a printer driver is installed in the host terminal to convert documents created or viewed by applications installed in the host terminal to printing data compatible with (namely, printable by) the image forming device, which is connected to the host terminal through the network, by using a page description language supported by the image forming device. Here, the "printing data compatible with the image forming device" means printing data able to be printed in the image forming device.

FIG. 1 is a block diagram illustrating a basic configuration of a printer driver.

As shown in FIG. 1, a printer driver 12 is installed in a host terminal 1, and includes a data reception section 121, which receives document data created or viewed by an application 11 installed in the host terminal 1, a GUI (Graphical User Interface) controller 122, which performs control so that setting values of the printer driver 12 or the document data are stored in a storage unit 123, the storage unit 123, which stores the setting values of the document data received by the data reception section 121 and the setting values of the printer driver 12 controlled by the GUI controller 122, and a writing section 124, which converts the document data to printing data compatible with the image forming device based on the setting values stored in the storage unit 123.

The data reception section 121 receives the document data created or viewed by the application 11, and the storage unit 123 obtains the setting values of the document data received by the data reception section 121 from the application 11. In addition, the storage unit 123 obtains the setting values of the printer driver 12 from the GUI controller 122 in order to convert the document data received by the data reception section 121 to printing data compatible with the image forming device. The setting values obtained by the storage unit 123 are sent to the writing section 124 through the data reception section 121, together with the document data received by the data reception section 121. Based on the setting values of the document data obtained from the application 11, and based on the setting values of the printer driver 12 obtained from the GUI controller 122, the writing section 124 converts the document data to the printing data compatible with the image forming device. The printing data converted by the writing section 124 is sent to the image forming device via the network from a port controller 13 of the host terminal 1.

In the latest network environments, usually, plural image forming devices are connected to the network. In addition, along with spreading of usage of mobile phones and portable PCs, it becomes necessary that one user be able to use different image forming devices at different sites; thus it is required that one host terminal be able to control plural image forming devices. For example, it is necessary that plural printer drivers corresponding to respective image forming devices be installed in the host terminal.

For example, Japanese Laid-Open Patent Application No. 2004-310488 (hereinafter, referred to as "reference 1") discloses a printing system in which one driver is installed in plural printing devices of the same type in one installation. In the printing system disclosed in reference 1, the plural printing devices appear to be managed with the same ID number but different network ID numbers; hence, on the side of the host terminal, which manages the plural printing devices, it is not necessary to install plural printer drivers.

However, the host terminal does not always control printing devices of the same type. When the host terminal controls printing devices of different types, the corresponding printer drivers should be installed in the host terminal. In addition, even when the host terminal always controls printing devices of the same type, a printing device in use may be exchanged for a new one because of the service life or trouble. Due to the exchange of the printing device, if it is required to extend functions of the printer driver installed in the host terminal, the printer driver having the extended functions should be installed in the host terminal. Installation of the printer driver in the host terminal increases workload imposed on the OS (Operating System) of the host terminal; furthermore, such installing increases cost and work time of the user.

To solve this problem, it has been proposed to install plug-in modules into the printer driver which has been installed in the host terminal, and to add the extended functions only when it is required to install a new printer driver having the extended functions.

For example, Japanese Laid-Open Patent Application No. 2005-173701 (hereinafter, referred to as "reference 2") discloses an information processing device able to efficiently install plug-in modules for realizing additional functions in existing printer drivers.

In recent years, along with improved functions of utility programs executing in the image forming device and the host terminal, the printer drivers have more and more functions. However, depending on users, different parts of functions of the printer drivers are used, and in many cases, not all of the functions of the printer drivers are necessary.

For example, Japanese Laid-Open Patent Application No. 2001-75758 (hereinafter, referred to as "reference 3") discloses a printer driver that can present the functions possessed by printers in a system only when setting the printer driver to use functions of a printer, and thus it is possible to make settings faithful to the functions possessed by the printers in a simple way and with high operability.

In the information processing device disclosed in reference 2, since only the new additional functions are installed as plug-in modules, the workload imposed on the information processing device is lowered compared to the device which has to re-install the whole printer driver. However, since the number of operations in the installation is not reduced, the workload imposed on the user, such as cost and work time, is reduced very little.

In the printer driver disclosed in reference 3, since a Dynamic Link Library (DLL) is required to provide data for setting printing conditions for each connected printer, in an environment including an unspecified number of connected printers, a large capacity storage device is required to store many DLLs.

SUMMARY OF THE INVENTION

An embodiment of the present invention may solve one or more problems of the related art.

A preferred embodiment of the present invention may provide an information processing device able to extend functions thereof without performing installation and enabling easy function settings.

According to an aspect of the present invention, there is provided an information processing device able to communicate with an image forming device, comprising:

a storage unit that stores basic information of the information processing device;

an information acquisition unit that acquires function information from the image forming device;

a function detection unit that detects a function of the image forming device from the function information acquired by the information acquisition unit; and a storage controller that determines whether a function data associated with the function detected by the function detection unit is included in the basic information stored in the storage unit, and modifies the basic information stored in the storage unit according to the determination results, wherein when the function data associated with the function detected by the function detection unit is not included in the basic information stored in the storage unit, the storage controller stores the function data in the storage unit.

According to the present embodiment, when new functions are added to the information processing device of the present invention, which is able to communicate with an image forming device, or when image forming devices of different types are connected, it is sufficient for the information processing device of the present invention to only acquire information not included in the basic information prepared beforehand from the image forming device. Hence, when an image forming device is added or updated, it is not necessary to introduce an information processing device corresponding to the image forming device each time the addition or updating occurs. Namely, the workload imposed on the user by the installation procedure is reduced. Therefore, according to the present invention, it is possible to provide an information processing device able to extend functions without performing the installation.

Here, "basic information" means minimum essential information included in software installed in advance as device drivers corresponding to the image forming device, and information added later.

As an embodiment, the basic information includes function data and a status flag associated with a function of the information processing device, the function information includes function data and a status flag associated with a function of the image forming device, and the storage controller assigns the status flag associated with a function of the image forming device to the status flag associated with a function of the information processing device, said function of the information processing device being the same as the function of the image forming device.

According to the present embodiment, it is possible to set functions of the information processing device in response to states of the image forming device. For example, when the image forming device is a printer, it is possible to recognize that some functions of the information processing device are currently not available due to factors on the side of the printer; for example, an optional device is not installed, or the printer is running out of consumable articles like staples or toner, or the size or type of the paper is not compatible. For example, if the optional device is installed in the printer later, and the factors preventing execution of a specific function are eliminated, this function becomes available.

As an embodiment, when function data included in the basic information is not included in the function information, the storage controller assigns a value to a status flag corresponding to the function data to indicate that the function data is included in the basic information but not included in the function information.

According to the present embodiment, it is possible to provide an information processing device able to utilize functions which are actually needed. Namely, when the information processing device according to the present invention is applied to a PC or other host terminals, even when an optional device is added, since the information processing device does not invoke the functions not currently available in the image forming device, it is possible to minimize the workload imposed on the OS of the host terminal.

As an embodiment, the information processing device further comprises a setting item input output unit that displays a setting graphic image based on the basic information stored in the storage unit, wherein the setting item input output unit modifies a form of the setting graphic image in response to a status flag corresponding to a function of the information processing device included in the basic information.

According to the present embodiment, a user can visually confirm the functions of the information processing device, and when setting function parameters of the information processing device, the user can easily and appropriately set the parameters in response to the states of the information processing device.

As an embodiment, the setting item input output unit refers to a status flag corresponding to the function data included in the basic information but not included in the function information, and does not display a setting item associated with the function data on the setting graphic image.

According to the present embodiment, a user can visually confirm functions which are currently available, and when setting function parameters of the information processing device, it is clear the settings of which functions can be modified and the operability is improved compared to the printer drivers including unnecessary functions.

Therefore, according to an embodiment of the present invention, since the information processing device can acquire information not included in the basic information only, which is the information of functions of the connected image forming device, and is the minimum essential information included in software installed in advance, it is possible to provide an information processing device able to extend functions without performing installation and that enables easy function settings.

These and other objects, features, and advantages of the present invention will become more apparent from the following detailed description of preferred embodiments given with reference to the accompanying drawings.

BRIEF DESCRIPTION OF THE DRAWINGS

FIG. 3A is a diagram illustrating an example of the printer function information;

FIG. 3B is a diagram illustrating an example of the basic information stored in the storage unit 21;

DESCRIPTION OF THE PREFERRED EMBODIMENTS

Below, preferred embodiments of the present invention are explained with reference to the accompanying drawings.

[Configuration of Information Processing Device]

Figure 1:
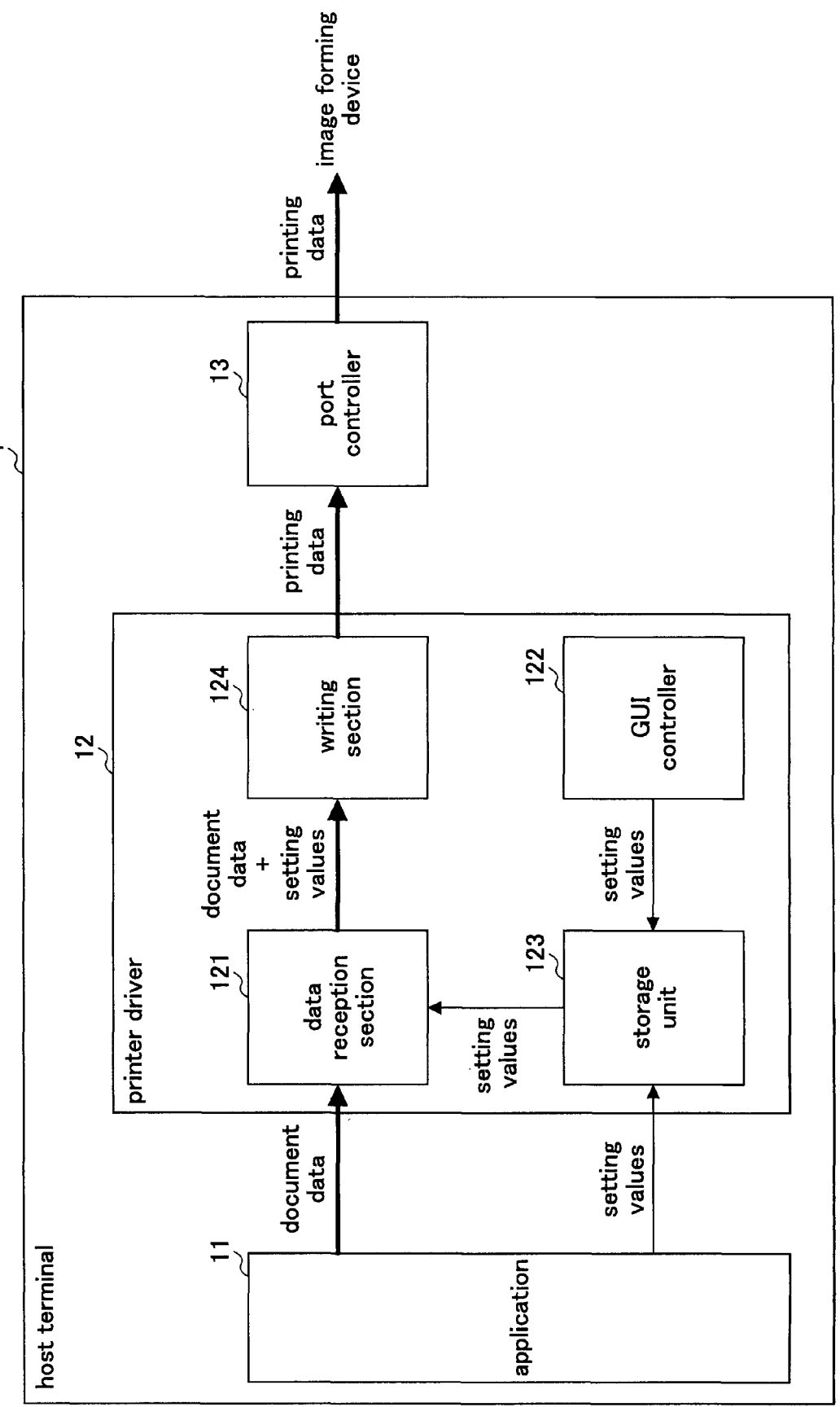
FIG. 1 is a block diagram illustrating a basic configuration of a printer driver.
Figure 2:
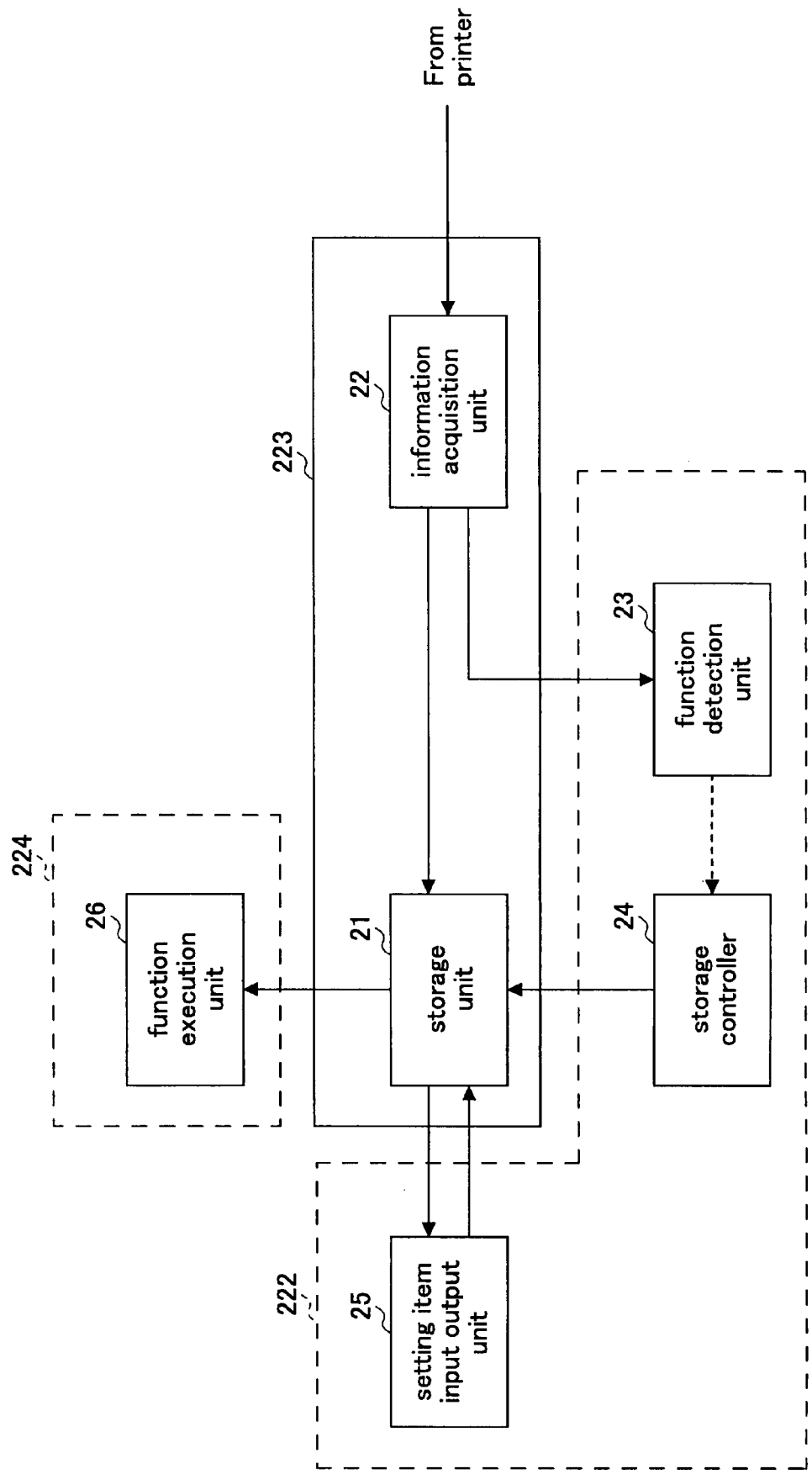
FIG. 2 is a block diagram illustrating an example of a configuration of an information processing device according to an embodiment of the present invention.

FIG. 2 is a block diagram illustrating an example of a configuration of an information processing device according to an embodiment of the present invention.

As shown in FIG. 2, an information processing device 2 includes a GUI controller 222, a settings storage unit 223, and a writing unit 224. These components realize functions of a printer driver for generating data interpretable by a printer connected through a network like a Local Area Network (LAN).

The settings storage unit 223 stores document data to be printed by the printer and setting values of the information processing device 2, and includes a storage unit 21 and an information acquisition unit 22. The storage unit 21 stores basic information of the information processing device. The basic information is used for the information processing device 2 to control the printer. The information acquisition unit 22 acquires, from the printer, function information of the printer.

The GUI controller 222 performs control so that setting values of the information processing device 2 or setting values of the document data to be printed by the printer are to be stored in the settings storage unit 223. The GUI controller 222 includes a function detection unit 23, a storage controller 24, and a setting item input output unit 25.

The function detection unit 23 detects all functions of the printer from the function information of the printer obtained by the information acquisition unit 22. The storage controller 24 controls data stored in the storage unit 21 so as to match the functions of the printer detected by the function detection unit 23.

The setting item input output unit 25 displays a graphic image on a screen for setting based on the information stored in the storage unit 21 to adjust setting values or issue control commands for generating data interpretable by the printer. For example, when the information processing device 2 is included in a PC, the setting item input output unit 25 displays the setting graphic image on the display device (such a monitor) of the PC, and in response to the setting graphic image on the display, a user operates an input device, like a mouse and a keyboard to receive input setting values.

The writing unit 224 converts document data, based on the information stored in the settings storage unit 223, to printing data, which is interpretable and to be printed by the printer. The writing unit 224 includes a function executing unit 26, which executes functions corresponding to an object printer based on data stored in the storage unit 21.

If the printer is powered on or is connected when the information processing device 2 is powered on, the information acquisition unit 22 detects a printer available to it, and obtains function information from the detected printer.

The function detection unit 23 detects all functions of the printer from the function information of the printer obtained by the information acquisition unit 22. The storage controller 24 controls the basic information stored in the storage unit 21 so as to match the functions of the printer detected by the function detection unit 23, for example, the storage controller 24 adds, deletes, and updates information in the storage unit 21.

The setting item input output unit 25 displays the setting graphic image on a display device (such a monitor) based on the basic information stored in the storage unit 21, thereby, allowing a user to adjust setting values or issue control commands so as to generate data interpretable by the printer. Once the graphic image is displayed on the display device the user inputs setting values by using input devices. The setting item input output unit 25 receives the setting values input by the user, and reflects the setting values into the basic information stored in the storage unit 21. Based on the basic information stored in the storage unit 21 updated by including the setting values input by the user, the function executing unit 26 generates data interpretable by the object printer.

[Method of Information Description]

Next, the printer function information obtained by the information acquisition unit 22 is explained with reference to the accompanying drawings.

FIG. 3A is a diagram illustrating an example of the printer function information.

As shown in FIG. 3A, the printer function information is managed to be a data list of functions $P(n)$ ($n=1, 2, \ldots, N$) currently available in the printer. Alternatively, the printer function information may be managed to include plural function groups each including a number of functions currently available in the printer. In addition, the function information also includes data of functions which are not currently available but may become available when an optional device is added.

The function information includes a status flag for identifying whether the function $P(n)$ is available currently. For example, the status flag has an "ON" state and an "OFF" state; when the status flag is in "ON" state, the function corresponding to the data including the status flag is currently available in the object printer. When the status flag is in "OFF" state, the function corresponding to the data including the status flag is currently not available in the object printer, for example, because the optional device is not installed, or the printer is running out of consumable articles like staples or toner, or the size or type of the paper is not compatible.

The function having a status flag in "OFF" state becomes available, for example, when the optional device is installed in the printer later, and the factors preventing execution of the function are eliminated. In this case, the status flag becomes "ON". Namely, the value of the status flag changes depending on the state of the object printer.

The storage controller 24 controls the data stored in the storage unit 21 based on the function information shown in FIG. 3A.

FIG. 3B is a diagram illustrating an example of the basic information stored in the storage unit 21.

As shown in FIG. 3B, the basic information includes initial information 31, which is minimum essential information included in software installed in advance for generating data interpretable by a printer, and additional information 32 added after installation.

The initial information 31 is managed to be a data list of functions $D(x)$ ($x=1, 2, \ldots, X$) currently available in the information processing device 2. Similarly, the additional information 32 is also managed to be a data list of functions $DT(y)$ ($y=1, 2, \ldots, Y$) currently available in the information processing device 2. Alternatively, the initial information 31 and the additional information 32 may also be managed to include plural function groups each including a number functions which are currently available in the information processing device 2.

Whether the functions $D(x)$ and the functions $DT(y)$ are executable depends on whether these functions are currently available in the object printer.

Various function data include status flags for identifying whether the functions $D(x)$ and the functions $DT(y)$ are currently executable. For example, the status flag has an "ON" state, an "OFF" state, and an "IMP" state. When the status flag is in "ON" state, the function corresponding to the data including the status flag is currently executable. When the status flag is in "OFF" state, the function corresponding to the data including the status flag is currently not executable, for example, because the optional device is not installed, or the printer is running out of consumable articles like staples or toner, the size or type of the paper is not compatible, or other factors on the side of the printer side. However, this function becomes available when the factors preventing execution of the function are eliminated, for example, when the optional device is installed in the printer later.

When the status flag is in "IMP" state, the function corresponding to the data including the status flag is absolutely not executable because of the specifications of the object printer. However, the function having a status flag in "IMP" state becomes executable when controlling other types of printers. In this case, the status flag becomes "ON" or "OFF". Namely, the value of the status flag changes depending on the type of the object printer.

The additional information 32 corresponds to the function available in the printer, which is detected by the function detection unit 23 from the function information as shown in FIG. 3A. When the additional information 32 is previously not included in the basic information stored in the storage unit 21, the additional information 32 corresponds to the information of the function which is added by the storage controller 24, detected by the function detection unit 23, and not included in the basic information.

[Operation of Information Processing Device]

Next, operations of the information processing device 2 of the present embodiment are explained with reference to the accompanying drawings.

When the information processing device 2 of the present embodiment, as shown in FIG. 2, is applied to a PC or other host terminals, in order for a printer to print document data created or viewed by applications installed in the host terminal, the information processing device 2 converts the document data to printing data which are interpretable by the printer and include control commands input by a user. The information processing device 2 is able to utilize functions of the printer.

Figure 4:
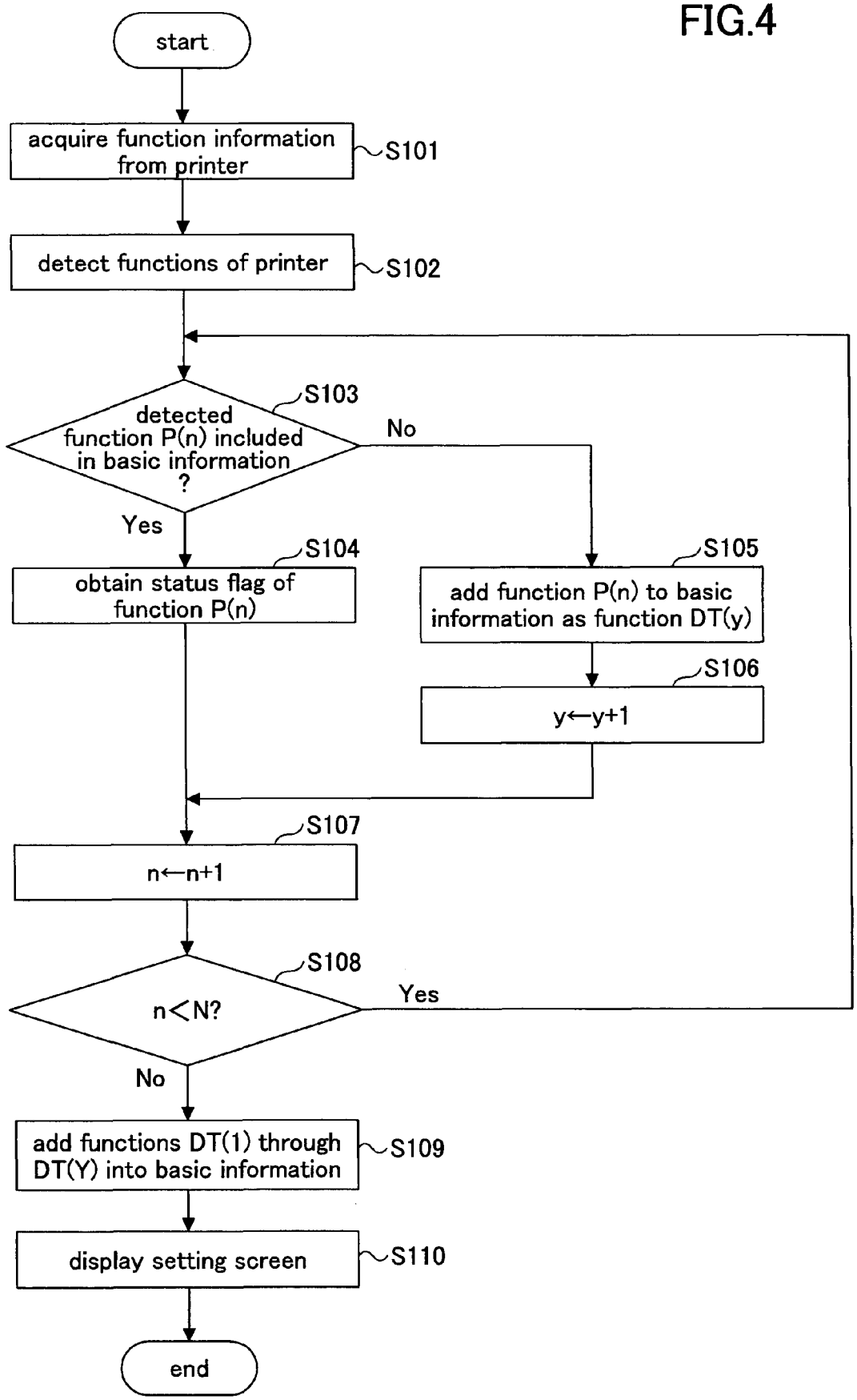
FIG. 4 is flowchart illustrating an example of operations of the information processing device 2 for adding or enabling functions of the printer.

FIG. 4 is flowchart illustrating an example of operations of the information processing device 2 for adding or enabling functions of the printer.

As shown in FIG. 4, in step S101, when the printer to perform printing is powered on or is connected, the information acquisition unit 22 acquires the function information of the printer from the printer.

In step S102, the function detection unit 23 detects all functions P(1) through P(N) of the printer described in the function information obtained by the information acquisition unit 22.

In step S103, the storage controller 24 determines whether the functions P(1) through P(N) of the printer detected by the function detection unit 23 are included in the basic information stored in the storage unit 21. In other words, the storage controller 24 determines whether the function P(n) included in the function information as shown in FIG. 3A is in agreement with one of the functions D(1) through D(X) included in the initial information 31 (basic information) as shown in FIG. 3B.

Note that in the present embodiment, the storage controller 24 determines whether the function P(n) exists in the initial information 31 (basic information) in order of description in the function information.

If the storage controller 24 determines that the function P(n) is in agreement with one of the functions D(1) through D(X) included in the initial information 31 (basic information), namely, the function P(n) of the object printer is included in the initial information 31 (basic information), the routine proceeds to step S104. Otherwise, the routine proceeds to step S105.

In step S104, since the function P(n) of the object printer is included in the initial information 31, the storage controller 24 obtains the status flag of the function P(n) of the object printer, and assigns the value of the status flag of the function P(n) to the status flag of the function D(x) corresponding to the function P(n). In other words, the storage controller 24 replaces the value of the status flag of the function D(x) with the value of the status flag of the function P(n).

In step S105, since the storage controller 24 determines that the function P(n) is not in agreement with any of the functions D(1) through D(X) included in the initial information 31, namely, the function P(n) of the object printer is not included in the initial information 31, the storage controller 24 regards the function P(n) of the object printer as an additional function DT(y). In addition, the storage controller 24 obtains the status flag of the function P(n) of the object printer, and associates the value of the status flag of the function P(n) with the function DT(y).

In step S106, the storage controller 24 increments the index of the additional function DT(y). Namely, the next additional function becomes DT(y+1).

In step S107, in order to determine whether the function P(n+1) next to the function P(n) in the function information exists in the basic information, the storage controller 24 increments the index of the function P(n). Namely, the next function of the object printer to be compared becomes P(n+1).

In step S108, the storage controller 24 determines whether the new index n of the function P(n) is less than to N, which is the upper limit of the index n. Namely, the storage controller 24 determines whether all of the functions P(n) included in the function information have been investigated.

If all of the functions P(n) included in the function information have been investigated, the routine proceeds to step S109. Otherwise, the routine returns to step S103 to repeat steps S103 through S107.

In step S109, since the index n of the function P(n) is greater than or equal to N, namely, all of the functions P(n) included in the function information have been investigated, the storage controller 24 stores the additional functions DT(1) through DT(Y) into the basic information in the storage unit 21 as the additional information 32 shown in FIG. 3B.

Note that if all of the functions P(n) of the object printer are included in the basic information, there is no additional function DT(n); hence, step S109 is not executed.

In step S110, the setting item input output unit 25 displays a graphic image on a screen, in which various setting items are displayed, in a display manner adapted to the status flags of the functions D(x) and the additional functions DT(y), which are included in the basic information stored in the storage unit 21. Below, the graphic image displayed on a screen and for a user to adjust setting values is referred to as a "setting graphic image" or a "setting screen".

Therefore, in the information processing device 2 of the present embodiment, when a printer is newly connected, it is possible to extend functions of the information processing device 2 without performing installation.

As described above, when it is detected that a function exists in the information processing device 2, but does not exist in the printer, the setting item input output unit 25 does not display the setting item of the function on the setting graphic image. Below, explanations are made of the operations of the information processing device 2 when it is detected that a function exists in the information processing device 2 but does not exist in the printer.

Figure 5:
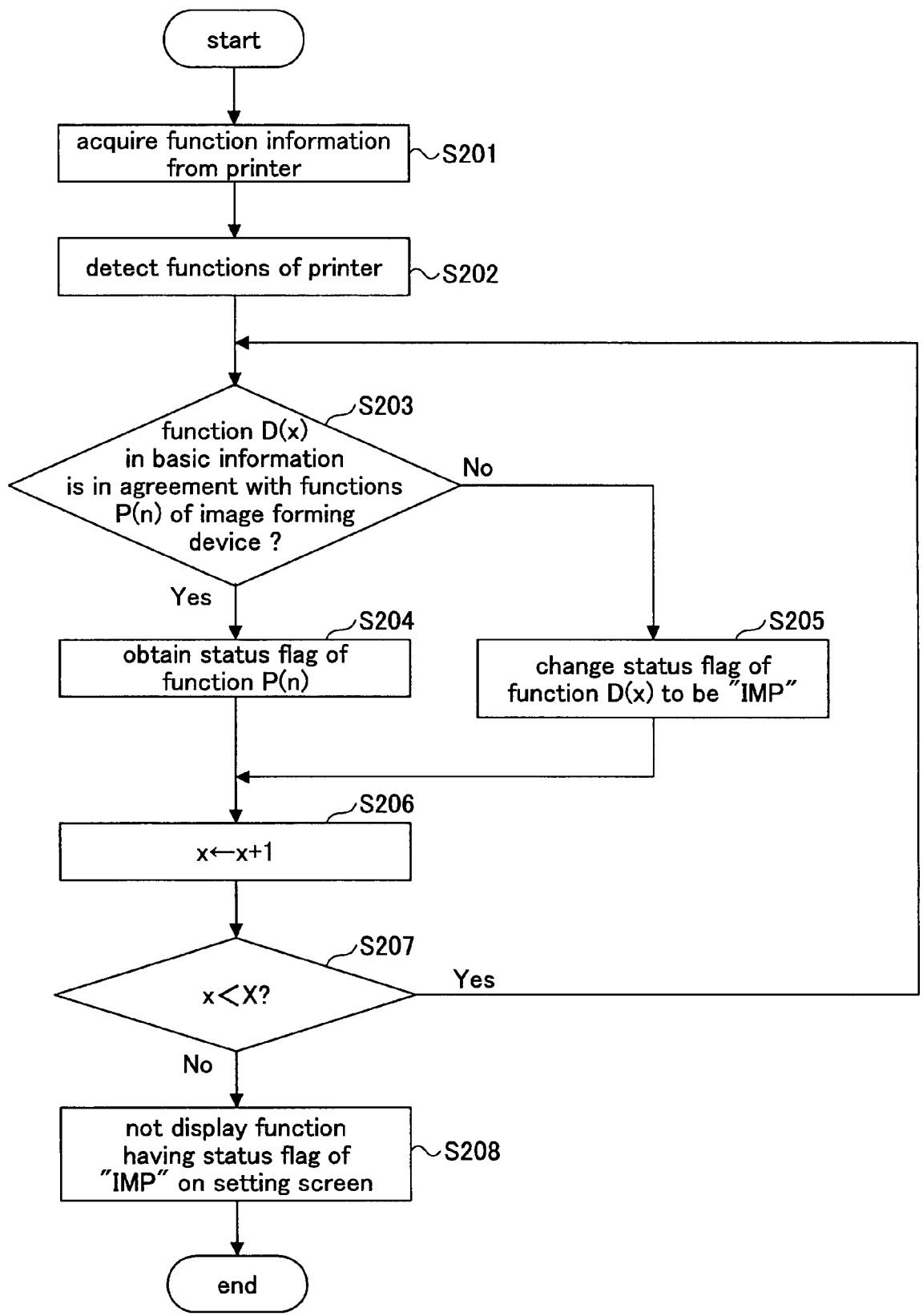
FIG. 5 is flowchart illustrating an example of operations of the information processing device 2 when a function existing in the information processing device 2 but not in the printer is detected.

FIG. 5 is flowchart illustrating an example of operations of the information processing device 2 when a function existing in the information processing device 2 but not in the printer is detected.

As shown in FIG. 5, in step S201, when the printer to perform printing is powered on or is connected, the information acquisition unit 22 acquires the function information of the printer from the printer.

In step S202, the function detection unit 23 detects all functions P(1) through P(N) of the printer described in the function information obtained by the information acquisition unit 22.

In step S203, the storage controller 24 determines whether a function D(x) included in the initial information 31 (basic information) is in agreement with one of the functions P(1) through P(N) of the object printer detected by the function detection unit 23.

Note that in the present embodiment, the storage controller 24 determines whether the function D(x) is in agreement with one of the functions P(1) through P(N) of the printer in order of description in the basic information.

If the storage controller 24 determines that the function D(x) included in the basic information is in agreement with one of the functions P(1) through P(N) of the printer, that is, a function P(n) of the object printer exists in the basic information, the routine proceeds to step S204. Otherwise, the routine proceeds to step S205.

In step S204, since the function P(n) of the object printer has been already included in the initial information 31, the storage controller 24 obtains the status flag of the function P(n) of the object printer, and assigns the value of the status flag of the function P(n), which is included in the basic information, to the status flag of the function D(x) corresponding to the function P(n). In other words, the storage controller 24 replaces the value of the status flag of the function D(x) with the value of the status flag of the function P(n).

Note that when the procedure shown in FIG. 5 is executed after the procedure shown in FIG. 4 is completed, since the status flag of the function P(n) of the object printer has been obtained, step 204 can be omitted.

In step S205, since the storage controller 24 determines that the function D(x) included in the basic information is not in agreement with any of the functions P(1) through P(N) of the printer, that is, the functions P(n) of the object printer do not exist in the basic information, the storage controller 24 sets the value of the status flag of the function D(x) included in the basic information to be "IMP".

In step S206, in order to determine whether the function D(x+1) next to the function D(x) in the basic information is in agreement with one of the functions P(1) through P(N) of the printer, the storage controller 24 increments the index of the function D(x).

In step S207, the storage controller 24 determines whether the new index x of the function D(x) is less than to X, which is the upper limit of the index x. Namely, the storage controller 24 determines whether all of the functions D(x) in the basic information have been compared with the functions P(1) through P(N) of the printer.

If all of the functions D(x) in the basic information have been compared with the functions P(1) through P(N), the routine proceeds to step S208. Otherwise, the routine returns to step S203 to repeat step S203 through S207.

In step S208, since the index x of the function D(x) is greater than or equal to X, namely, all of the functions D(x) in the basic information have been compared with the functions P(1) through P(N), the setting item input output unit 25 refers to the status flags of the functions D(x) included in the basic information stored in the storage unit 21, and displays the setting graphic image on which only the setting items of the function having the status flag in "IMP" state, which indicates that the function is absolutely not executable, is not displayed.

Therefore, in the information processing device 2 of the present embodiment, since the functions having the status flag in the "IMP" state, which indicates that the functions are absolutely not executable, are not displayed on the setting graphic image, namely, the functions not existing in the object printer basic are not displayed on the setting graphic image, it is possible to improve convenience and operability of the setting graphic image, and make function settings easy.

It should be noted that the procedure in FIG. 4 and the procedure in FIG. 5 can be combined. However, since the procedure in FIG. 4 determines whether the function D(x) included in the basic information exists in the functions P(1) through P(n) of the object printer, but the procedure in FIG. 5 determines whether the function P(n) of the object printer in the function information exists in the functions D(1) through D(x) included in the basic information, when executing the procedures in FIG. 4 and in FIG. 5, overlapping operations occur. Thus, for example, during the procedure in FIG. 4, in step S103, when the storage controller 24 determines that among the functions D(1) through D(X) included in the basic information, a function D(x) is not in agreement with any of the function P(n) included in the function information, the storage controller 24 automatically sets the value of the status flag of the function D(x) to be "IMP". In this way, the procedure in FIG. 5 can be omitted.

[Mode of Setting Screen]

As described above, the mode of the setting screen displayed by the setting item input output unit 25 depends on the status flags of the functions D(x) and DT(y) included in the basic information in the storage unit 21.

For example, when the status flag is in "ON" state, the function corresponding to the function data including this status flag is currently available, and settings of the function can be further modified. In this case, for example, the setting item corresponding to this function can be displayed to have a full brightness to notify the user of the message.

When the status flag is in "OFF" state, the function corresponding to the data including the status flag is not available in the current status of the printer, and the settings of the functions cannot be modified, but if the status of the printer changes, the corresponding function becomes available. In this case, for example, the setting item corresponding to this function can be displayed to have a half brightness to notify the user of the message.

When the status flag is in "IMP" state, the function corresponding to the data including the status flag is absolutely not executable because of specifications of the object printer. In this case, for example, the setting item corresponding to this function is not displayed on the setting screen.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

For example, in the above embodiments, it is described that the information processing device is connected to a printer as an example of an image forming device, and a printer driver is described for generating data interpretable to the printer, but the present invention is not limited to this. For example, the present invention is applicable to a scanner driver, PC-FAX driver, or other device drivers as long as the driver can convert instructions from applications to data able to be processed by a device.

In addition, the present invention is not limited to device drivers and equivalent modules, but is applicable to applications themselves.

Further, the present invention can be realized by programs stored in a memory, such as a hard disk (HDD) of an information processing device, or a Read-Only-Memory (ROM). Namely, the present invention can be realized by executing programs enabling function extension as described above.

This patent application is based on Japanese Priority Patent Applications No. 2006-075647 filed on Mar. 17, 2006, and No. 2007-018552 filed on Jan. 29, 2007, the entire contents of which are hereby incorporated by reference.

What is claimed is:

1. An information processing device able to communicate with an image forming device, comprising:
    a storage unit that stores basic information of the information processing device;
    an information acquisition unit that obtains function information from the image forming device;
    a function detection unit that detects a function of the image forming device from the function information obtained by the information acquisition unit; and
    a storage controller that determines whether a function data associated with the function detected by the function detection unit is included in the basic information stored in the storage unit, and modifies the basic information stored in the storage unit according to the determination results;
    wherein when the function data associated with the function detected by the function detection unit is not included in the basic information stored in the storage unit, the storage controller stores the function data in the storage unit, such that the storage unit stores information for the image forming device, including function data indicating functions of the image forming device;
    wherein said information processing device further comprises a setting item input output unit for displaying a print setting screen including setting items for function data based on the basic information; and
    wherein said storage controller compares the function information obtained from the image forming device with the basic information, such that additional function data that is not included in the basic information is found and added to the basic information, and a setting item for the additional function data is added to the print setting screen, and wherein the image forming device includes a corresponding printer.

2. The information processing device as claimed in claim 1, wherein the basic information includes a status flag associated with a function of the information processing device, the function information obtained by the information acquisition unit includes a status flag associated with a function of the image forming device, and the storage controller assigns the status flag associated with a function of the image forming device to the status flag associated with a function of the information processing device, said function of the information processing device being the same as the function of the image forming device.

3. The information processing device as claimed in claim 2, wherein when a function data included in the basic information is not included in the function information obtained by the information acquisition unit, the storage controller assigns a value to a status flag corresponding to the function data to indicate that the function data is included in the basic information but not included in the function information.

4. The information processing device as claimed in claim 3, wherein the setting item input output unit displays a setting graphic image based on the basic information stored in the storage unit, wherein the setting item input output unit modifies a form of the setting graphic image in response to a status flag corresponding to a function of the information processing device included in the basic information.

5. The information processing device as claimed in claim 4, wherein the setting item input output unit refers to a status flag corresponding to the function data included in the basic information but not included in the function information, and does not display a setting item associated with the function data on the setting graphic image.

6. The information processing device as claimed in claim 3, wherein the basic information includes a plurality of function data and a corresponding plurality of status flags associated with a plurality of functions of the information processing device and the function information includes a plurality of function data and a corresponding plurality of status flags associated with a plurality of functions of the image forming device.

7. The information processing device as claimed in claim 3, wherein the status flag corresponding to the function data included in the function information comprises an "ON" state indicating the associated function is currently executable by the image forming device and an "OFF" state indicating the associated function is currently not executable by the image forming device.

8. The information processing device as claimed in claim 7, wherein the status flag corresponding to the function data included in the function information further comprises an "IMP" state indicating the associated function is not executable by the image forming device.

9. The information processing device as claimed in claim 6, wherein the storage controller assigns the status flag associated with each of the plurality of functions of the image forming device to the status flag associated with the same function of the information processing device as the corresponding function of the image forming device.

10. The information processing device as claimed in claim 5, wherein the setting item input output unit displays the setting graphic image in full brightness if the corresponding status flag is in the "ON" state and displays the setting graphic image in half brightness if the corresponding status flag is in the "OFF" state.

11. An information processing method performed by an image processing device, comprising:
    storing basic information of the information processing device in a storage unit of the image processing device;
    obtaining function information from an image forming device that is able to communicate with the image processing device;
    detecting a function of the image forming device from the obtained function information;
    determining whether a function data associated with the detected function is included in the basic information stored in the storage unit;
    modifying the basic information stored in the storage unit according to the determination results; and
    storing the function data in the storage unit when the function data associated with the detected function is not included in the basic information stored in the storage unit, such that the storage unit stores information for the image forming device, including function data indicating functions of the image forming device; and causing a setting item input output unit to display a print setting screen including setting items for function data based on the basic information;

wherein said determining, modifying and storing steps include comparing the function information obtained from the image forming device with the basic information, such that additional function data that is not included in the basic information is found and added to the basic information, and wherein a setting item for the additional function data is added to the print setting screen, and wherein the image forming device includes a corresponding printer.

12. The information processing method as claimed in claim 11, wherein the basic information includes a status flag associated with a function of the information processing device, the obtained function information includes a status flag associated with a function of the image forming device, and the method further comprising assigning the status flag associated with a function of the image forming device to the status flag associated with a function of the information processing device, said function of the information processing device being the same as the function of the image forming device.

13. The information processing method as claimed in claim 12, wherein when a function data included in the basic information is not included in the obtained function information, the method further comprising assigning a value to a status flag corresponding to the function data to indicate that the function data is included in the basic information but not included in the function information.

14. The information processing method as claimed in claim 13, further comprising: displaying a setting graphic image based on the basic information stored in the storage unit; and modifying a form of the setting graphic image in response to a status flag corresponding to a function of the information processing device included in the basic information.

15. The information processing method as claimed in claim 14, further comprising not displaying a setting item on the setting graphic image associated with the function data that is included in the basic information but not included in the function information.

16. The information processing method as claimed in claim 13, wherein the basic information includes a plurality of function data and a corresponding plurality of status flags associated with a plurality of functions of the information processing device and the function information includes a plurality of function data and a corresponding plurality of status flags associated with a plurality of functions of the image forming device.

17. The information processing method as claimed in claim 13, wherein the status flag corresponding to the function data included in the function information comprises an "ON" state indicating the associated function is currently executable by the image forming device and an "OFF" state indicating the associated function is currently not executable by the image forming device.

18. The information processing method as claimed in claim 17, wherein the status flag corresponding to the function data included in the function information further comprises an "IMP" state indicating the associated function is not executable by the image forming device.

19. The information processing method as claimed in claim 16, further comprising assigning the status flag associated with each of the plurality of functions of the image forming device to the status flag associated with the same function of the information processing device as the corresponding function of the image forming device.

20. The information processing method as claimed in claim 15, further comprising displaying the setting graphic image in full brightness if the corresponding status flag is in the "ON" state and displaying the setting graphic image in half brightness if the corresponding status flag is in the "OFF" state.

* * * * *